(12) United States Patent
Bouron et al.

(10) Patent No.: US 9,410,579 B2
(45) Date of Patent: Aug. 9, 2016

(54) CAGE WITH PARALLEL POCKETS FOR ROLLING BEARING

(71) Applicant: Aktiebolaget SKF, Göteborg (SE)

(72) Inventors: Cyril Bouron, Puits de Courson (FR); Jean-Baptiste Magny, Migé (FR); Pascal Ovize, Chitry le Fort (FR); Pascal Vioux, Provency (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/257,454

(22) Filed: Apr. 21, 2014

(65) Prior Publication Data

US 2015/0267749 A1    Sep. 24, 2015

(30) Foreign Application Priority Data

Apr. 19, 2013  (EP) .................... 13164516

(51) Int. Cl.
  *F16C 33/48*  (2006.01)
  *F16C 33/46*  (2006.01)
  *F16C 19/36*  (2006.01)
  *F16C 33/51*  (2006.01)

(52) U.S. Cl.
  CPC .............. *F16C 33/467* (2013.01); *F16C 19/362* (2013.01); *F16C 33/4635* (2013.01); *F16C 33/513* (2013.01); *F16C 2220/04* (2013.01)

(58) Field of Classification Search
  CPC ........ F16C 19/362; F16C 29/04; F16C 33/51; F16C 33/513; F16C 33/516; F16C 33/4635; F16C 33/467
  USPC .......................... 384/51, 548, 572, 573, 576
  See application file for complete search history.

(56) References Cited

U.S. PATENT DOCUMENTS

| | | | | |
|---|---|---|---|---|
| 2,349,824 | A | * | 5/1944 | Irasek ........................... 384/623 |
| 2,430,359 | A | * | 11/1947 | Messinger .................... 384/622 |
| 2,628,137 | A | | 2/1953 | Ashton |
| 4,065,192 | A | | 12/1977 | Sague |
| 4,755,065 | A | | 7/1988 | Walter |
| 4,915,513 | A | * | 4/1990 | Orain ............................ 384/447 |
| 6,547,441 | B2 | * | 4/2003 | Kato ............................. 384/447 |
| 7,073,948 | B2 | * | 7/2006 | Neder et al. .................. 384/447 |
| 2011/0249931 | A1 | * | 10/2011 | Omoto et al. ................. 384/572 |

FOREIGN PATENT DOCUMENTS

| | | |
|---|---|---|
| EP | 2065604 A1 | 6/2009 |
| FR | 1226229 A | 7/1960 |
| GB | 2099089 | * 5/1982 |
| GB | 2099089 A | 12/1982 |
| WO | WO2011162729 | * 12/2011 |

* cited by examiner

*Primary Examiner* — James Pilkington
(74) *Attorney, Agent, or Firm* — Bryan Peckjian; SKF USA Inc. Patent Dept.

(57) ABSTRACT

A cage for a rolling bearing including a plurality of cage segments is provided. Each segment has a first set of pockets for a first set of rollers, and a second set of pockets for a second set of rollers. The axes of the pockets of the first set of pockets are parallel with each other and the axes of the pockets of the second set of pockets are parallel with each other.

9 Claims, 2 Drawing Sheets

CAGE WITH PARALLEL POCKETS FOR ROLLING BEARING

CROSS-REFERENCE TO RELATED APPLICATIONS

This application claims priority to European Patent Application EP13164516 filed Apr. 19, 2013.

FIELD OF THE INVENTION

The present invention relates to roller bearings or anti friction bearings having an inner ring, an outer ring, and one or more rows of contact rollers therebetween, in particular to a cage designed to maintain a circumferential distance between the rollers.

BACKGROUND OF THE INVENTION

The invention relates more particularly to the field of large-diameter roller bearings, notably those used in a tunnel boring machine, or in the field of defence such as radars, char, or excavator applications in which the cage is formed from a plurality of individual cage segments.

A large-diameter rolling bearing comprises generally two concentric inner and outer rings, at least a row of contact rollers arranged between raceways provided on said rings, and a plurality of cages disposed circumferentially between the rollers. Such rolling bearings are generally loaded, axially and radially as well as with tilting moments, often with a relatively strong load.

Each cage segments generally comprises concentric pockets and are generally made of metallic material or plastic material by cutting.

The manufacturing of such cages is thus particularly difficult and the use of plastic material would lead to problems in demoulding the cage.

One aim of the present invention is to overcome these drawbacks.

SUMMARY OF THE INVENTION

It is a particular object of the present invention to provide a cage which is simple to manufacture by reducing the demoulding operations and economic.

It is another object of the present invention to provide a cage which made of polymer material by injection moulding.

In one embodiment, a cage for a roller bearing comprises a plurality of cage segments having each a first set of pockets for a first set of rollers, and a second set of pockets for a second set of rollers.

The axis of the pockets of the first set are parallel with each other and the axis of the pockets of the second set are parallel with each other.

The cage is thus easier to manufacture and can be made of polymer material by injection molding process. The molding and demolding of the cage is simplified by the parallelism of the axis of the pockets.

Advantageously, the pockets of the first set are disposed in a first direction and the pockets of the second set are disposed in a second direction. For example, the first direction is perpendicular to the second direction. The axes of the pockets of the first set are thus perpendicular to the axes of the pockets of the second set.

In another embodiment, each pocket has a conical shape in cross section. The angle of the conical shape of each pocket can be comprised between 0.1° and 10°.

Each cage segment can be made from polymer material, for example by injection molding.

In an embodiment, each cage segment comprises six pockets.

For example, the first set of pockets comprises two pockets and the second set of pockets comprises four pockets.

In another aspect of the invention, a rolling bearing comprises an inner ring, an outer ring, at least one row of contact rollers disposed between raceways provided on the rings and a plurality of cage segments as previously defined and disposed circumferentially between the rollers.

BRIEF DESCRIPTION OF THE DRAWINGS

The present invention and its advantages will be better understood by studying the detailed description of a specific embodiment given by way of non-limiting example and illustrated by the appended drawings on which.

DETAILED DESCRIPTION OF THE INVENTION

Figure 1:
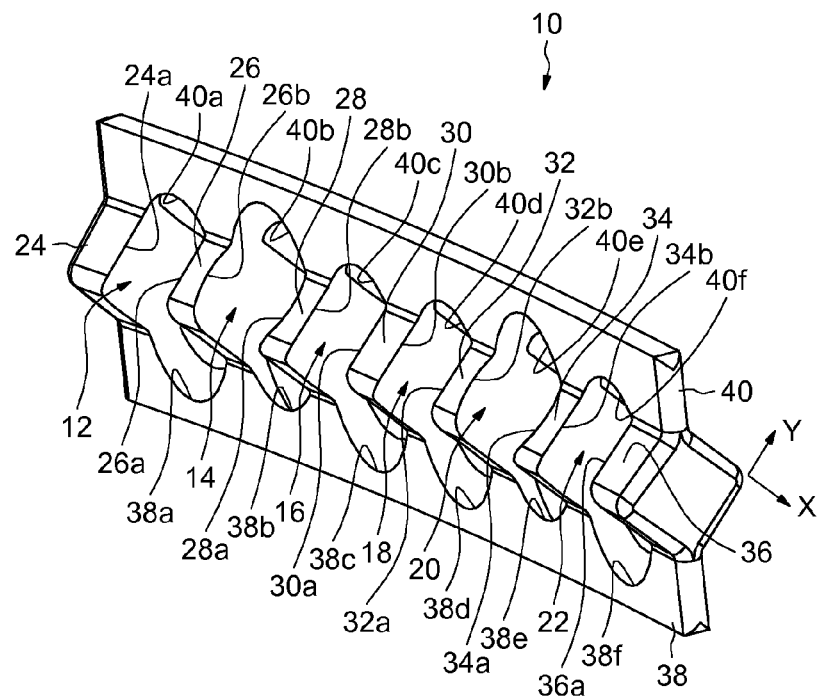
FIG. 1 is a perspective view of segmented cage for a roller bearing according to an embodiment of the invention.

The cage segment 10 as illustrated on the FIG. 1 is designed to be assembled in a rolling bearing (not shown) of large-diameter comprising an inner ring and an outer ring between which is housed one row of contact rollers. The rolling bearing thus comprises a plurality of cage segments 10 disposed circumferentially between the rollers to maintain their circumferential spacing. The inner and outer rings (not shown) are generally concentric and extend axially along the bearing rotation axis (not shown) of the rolling bearing.

The cage segment 10 comprises a first set of pockets for a first set of rollers and a second set of pockets for a second set of rollers.

As illustrated, the cage segment 10 comprises two pockets 14, 20 of the first set of pockets and four pockets 12, 16, 18, 22 of the second set of pockets. As an alternative, the cage segment 10 may comprise different numbers of pockets of the first set and of the second set of pockets.

Figure 3:
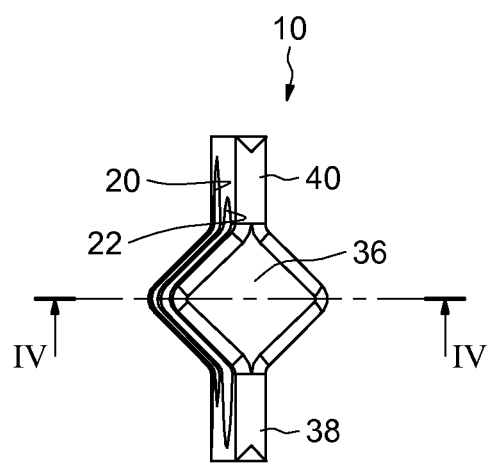
FIG. 3 is a side view of the cage of FIG. 1.

The pockets 12, 14, 16, 18, 20, 22 are located between two end portions 24, 36 and are separated by parallel connecting portions 26, 28, 30, 32, 34 located circumferentially between two adjacent pockets. Each connecting portion 26, 28, 30, 32, 34 is provided with a raceway for the rollers. The end portions 24, 36 and the connecting portions 26, 28, 30, 32, 34 have a paralelepipedic shape, as illustrated in FIG. 3 and extend along a vertical axis Z, perpendicular to a transverse axis Y and to an axial axis X, with two ribs 38, 40 connecting the end portions 24, 36 and the connecting portions 26, 28, 30, 32, 34 together.

The ribs 38, 40 are provided with grooves 38a, 36b, 38c, 38d, 38e, 38f, and 40a, 40b, 40c, 40d, 40e, 40f for the rollers 50, 51, 52, 53, 54, 55 and are adapted to come into contact with the facing guiding surfaces of the inner and outer rings (not shown).

Figure 2:
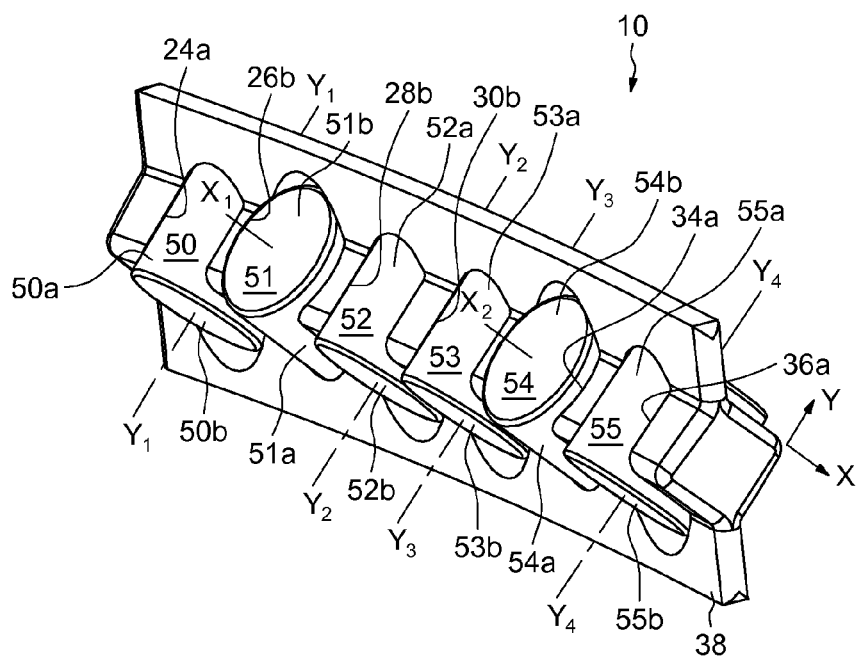
FIG. 2 is the segmented cage of FIG. 1 provided with rollers.

Referring once again to FIG. 2, a first end portion 24 and a first connecting portion 26 of the cage segment 10 delimit a first pocket 12 for receiving one roller 50 having a rotational axis $Y_1$-$Y_1$ along the transverse axis Y. The pocket 12 is vertically opened on grooves 38a, 40a in the ribs 38, 40. The first end portion 24 comprises a first axial surface 24a and the first connecting portion 26 comprises a first axial surface 26a. The axial surfaces 24a, 26a form the raceway for the roller 50.

The first connecting portion 26 of the cage segment 10 comprises a second axial surface 26b delimiting with a first axial surface 28a of a second connecting portion 28 adjacent to the first connecting portion 26 a second pocket 14 for receiving one roller 51 having a rotational axis $X_1$-$X_1$ along the axial axis X. The pocket 14 is vertically opened on grooves 38b, 40b in the ribs 38, 40. The axial surfaces 26b, 28a form the raceway for the roller 51.

The second connecting portion 28 of the cage segment 10 comprises a second axial surface 28b delimiting with a first axial surface 30a of a third connecting portion 30 adjacent to the second connecting portion 28 a third pocket 16 for receiving one roller 51 having a rotational axis $Y_2$-$Y_2$ along the transversal axis Y. The pocket 16 is vertically opened on grooves 38c, 40c in the ribs 38, 40. The axial surfaces 28b, 30a form the raceway for the roller 51.

The third connecting portion 30 of the cage segment 10 comprises a second axial surface 30b delimiting with a first axial surface 32a of a fourth connecting portion 32, adjacent to the third connecting portion 30, a fourth pocket 18 for receiving one roller 52 having a rotational axis $Y_3$-$Y_3$ along the transversal axis Y. The pocket 18 is vertically opened on grooves 38d, 40d in the ribs 38, 40. The axial surfaces 30b, 32a form the raceway for the roller 52.

The fourth connecting portion 32 of the cage segment 10 comprises a second axial surface 32b delimiting with a first axial surface 34a of a fifth connecting portion 34 adjacent to the fourth connecting portion 32 a fifth pocket 20 for receiving one roller 54 having a rotational axis $X_2$-$X_2$ along the axial axis X. The pocket 20 is vertically opened on grooves 38e, 40e in the ribs 38, 40. The axial surfaces 32b, 34a form the raceway for the roller 54.

The fifth connecting portion 34 of the cage segment 10 comprises a second axial surface 34b delimiting with a first axial surface 36a of a second end portion 36, adjacent to the fifth connecting portion 34, a sixth pocket 22 for receiving one roller 55 having a rotational axis $Y_4$-$Y_4$ along the transversal axis Y. The pocket 22 is vertically opened on grooves 38f, 40f in the ribs 38, 40. The axial surfaces 34b, 36a form the raceway for the roller 55.

The axes of the pockets 14, 20 of the first set of pockets are arranged in a first direction and the pockets 12, 16, 18, 22 of the second set of pockets are arranged in a second direction, for example, the axes X-X of the pockets 14, 20 of the first set are perpendicular to the axes Y-Y of the pockets 12, 16, 18, 22 of the second set.

As illustrated, the axes $X_1$-$X_1$, $X_2$-$X_2$ of the pockets 14, 20 of the first set are parallel with each other and the axes $Y_1$-$Y_1$, $Y_2$-$Y_2$, $Y_3$-$Y_3$ and $Y_4$-$Y_4$ of the pockets 12, 16, 18, 22 of the second set are parallel with each other.

Figure 4:
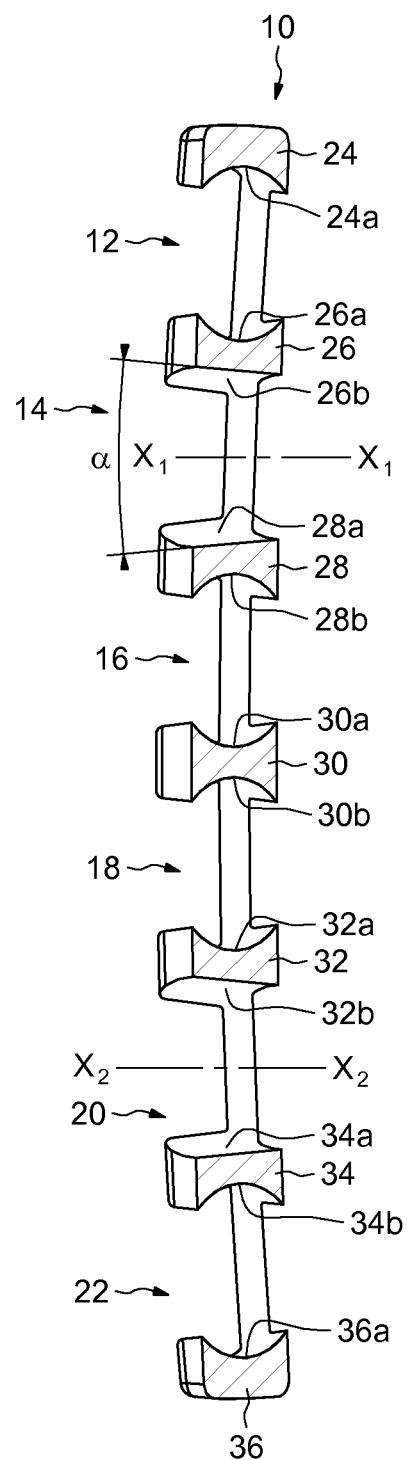
FIG. 4 is an axial section, along line IV-IV of FIG. 3.

In order to limit the induced friction torque of the cage with the rollers, each pocket 14, 20 of the first set of pockets has a conical shape in cross section and the angle a, illustrated on FIG. 4, of the conical shape of each pockets of the first set, between the adjacent surfaces 26b, 28a and 32b, 34a forming the raceway for the rollers 51, 54 is comprised between 0.1° and 10°.

Even though it is not shown, each pocket 12, 16, 18, 22 of the second set of pockets has a conical shape in cross section and the angle of the conical shape of each pockets of the second set, between the adjacent surfaces forming the raceway for the rollers 50, 52, 53, 55 is comprised between 0.1° and 10°.

The rollers 50, 51, 52, 53, 54, 55 are identical with one another and each comprise an outer rolling surface 50a, 51a, 52a, 53a, 54a, 55a and opposite end transverse faces 50b, 51b, 52b, 53b, 54b, 55b delimiting axially the rolling surface. In the illustrated embodiment, the rolling surface of each roller has a cylindrical profile. Alternatively, the rolling surfaces may have a spherical profile.

The cage segment 10 may be made from polymer material such as polyamide, for instance by injection molding.

Thanks to particular orientation of the pockets, the demoulding of the cage is easier to manufacture. Indeed, during the demolding operation, only one movement of the mould, for example along the axial axis X, is necessary for demoulding the cage segment.

The conical shape of the pockets allows a clearance of the rollers which are thus easier positioned in the raceways of the rings of the rolling bearing. The rollers are thus better guided and the friction is reduced between the rollers and the cage.

The invention claimed is:

1. A radial cage for a rolling bearing comprising:
a plurality of cage segments, the plurality of cage segments being discrete individual components configured to be arranged end-to-end along a circumference to collectively serve as the radial cage for the rolling bearing, each of the plurality of cage segments comprising:
a first rib and a second rib which are spaced from each other and connected by a plurality of connecting portions, the first and second ribs each having a radially inner surface and a radially outer surface, the radially inner surface facing radially toward an axis of rotation and the radially outer surface facing radially away from the axis of rotation,
a first set of pockets for a first set of rollers, and
a second set of pockets for a second set of rollers, wherein the axes of the pockets of the first set of pockets are parallel with each other, the axes of the pockets of the second set of pockets are parallel with each other, wherein the first and second sets of pockets are delimited by the plurality of connecting portions which each form at least one rolling surface such that each of the at least one rolling surface extends radially inwardly toward the axis of rotation from the first and second ribs and also extends radially outwardly away from the axis of rotation from the first and second ribs, at least one of the plurality of connecting portions forming two rolling surfaces for adjacent rollers wherein the two rolling surfaces of the at least one of the plurality of connecting portions are configured to engage rollers having non-parallel axes of rotation, each of the plurality of connecting portions having an axial width which decreases the farther it radially extends past the first and second ribs.

2. The radial cage according to claim 1, wherein the pockets of the first set of pockets are disposed in a first direction and the pockets of the second set of pockets are disposed in a second direction, wherein each of the at least one rolling surface is configured to extend along an arc of an outer surface of a corresponding roller such that the rolling surface extends partially along an upper portion of the corresponding roller and along a lower portion of the corresponding roller relative to the axis of rotation of the corresponding roller.

3. The radial cage according to claim 2, wherein the first direction is perpendicular to the second direction, and wherein the two rolling surfaces on the at least one of the plurality of connecting portions are askew with respect to each other by ninety degrees.

4. A cage for a rolling bearing comprising:
a plurality of cage segments, each of the plurality of cage segments having a first set of pockets for a first set of rollers, and a second set of pockets for a second set of rollers, wherein
the axes of the pockets of the first set of pockets are parallel with each other, and wherein
the axes of the pockets of the second set of pockets are parallel with each other, the pockets of the first set of pockets are disposed in a first direction and the pockets of the second set of pockets are disposed in a second direction which is perpendicular to the first direction, each pocket of the first set of pockets and each pocket of the second set of pockets has a conical shape in cross section.

5. The cage according to claim 4, wherein the angle of the conical shape of each pocket is between 0.1° and 10°.

6. The cage according to claim 5, wherein each cage segment is made from polymer material.

7. The cage according to claim 6, wherein each cage segment is made by injection molding.

8. The cage according to claim 7, wherein each cage segment provides six pockets.

9. The cage according to claim 8, wherein the first set of pockets provides two pockets and the second set of pockets provides four pockets.

* * * * *